(12) United States Patent
Jang

(10) Patent No.: US 12,474,461 B2
(45) Date of Patent: Nov. 18, 2025

(54) RADAR CONTROL DEVICE AND METHOD

(71) Applicant: HL Klemove Corp., Incheon (KR)

(72) Inventor: SangHee Jang, Seongnam-si (KR)

(73) Assignee: HL Klemove Corp., Incheon (KR)

( * ) Notice: Subject to any disclaimer, the term of this patent is extended or adjusted under 35 U.S.C. 154(b) by 358 days.

(21) Appl. No.: 18/070,816

(22) Filed: Nov. 29, 2022

(65) Prior Publication Data
US 2023/0288550 A1      Sep. 14, 2023

(30) Foreign Application Priority Data

Mar. 10, 2022   (KR) ........................ 10-2022-0029987

(51) Int. Cl.
*G01S 13/42*      (2006.01)
*G01S 13/72*      (2006.01)
*G01S 13/931*     (2020.01)

(52) U.S. Cl.
CPC .......... *G01S 13/426* (2013.01); *G01S 13/723* (2013.01); *G01S 13/931* (2013.01)

(58) Field of Classification Search
CPC .................. B60W 60/00272; B60W 60/00276
See application file for complete search history.

(56) References Cited

U.S. PATENT DOCUMENTS

| | | | | |
|---|---|---|---|---|
| 10,216,189 B1 * | 2/2019 | Haynes | ........... | B60W 60/00276 |
| 11,634,162 B2 * | 4/2023 | Haynes | ........... | B60W 60/00272 |
| | | | | 701/27 |
| 2018/0354506 A1 * | 12/2018 | Minemura | ............ | G01S 13/931 |
| 2022/0089192 A1 * | 3/2022 | Gyllenhammar | ..... | G01S 13/931 |

FOREIGN PATENT DOCUMENTS

| | | |
|---|---|---|
| JP | 2000249759 A | 9/2000 |
| JP | 2010071855 A | 4/2010 |
| JP | 6425130 B2 | 11/2018 |
| JP | 6608793 B2 | 11/2019 |

OTHER PUBLICATIONS

Notice of Allowance issued in Korean Patent Application No. 10-2022-0029987 dated Nov. 20, 2023.

* cited by examiner

*Primary Examiner* — Bernarr E Gregory
(74) *Attorney, Agent, or Firm* — Harvest IP Law, LLP

(57) ABSTRACT

The embodiments relate to a radar control device and method. Specifically, a radar control device according to the embodiments may include a transceiver configured to transmit a transmission signal and receive a reflected reception signal, an object position determiner configured to determine a first measurement in a first period and a second measurement in a second period after the first period based on the reception signal, and an object direction estimator configured to set a plurality of boundary lines around the first object position, determine a plurality of predicted objects each having, as an orientation angle, a direction in which the plurality of boundary lines extend from a center of the first object position, respectively, and estimate an orientation angle of a predicted object closest to the second object position as an orientation angle of the object in the second period.

16 Claims, 7 Drawing Sheets

● Position of 1st scan

RADAR CONTROL DEVICE AND METHOD

CROSS REFERENCE TO RELATED APPLICATION

This application claims priority from Republic of Korea Patent Application No. 10-2022-0029987, filed on Mar. 10, 2022, which is hereby incorporated by reference for all purposes as if fully set forth herein.

TECHNICAL FIELD

The embodiments of the present disclosure relate to a radar control device and method for estimating a direction or an orientation angle of an object.

Recently, the number of vehicles equipped with radar is increasing. An electronic control unit of the vehicle may calculate the distance, angle and a range rate between the host vehicle and an object around the host vehicle based on the information output from the radar mounted on the vehicle.

The vehicle equipped with a radar may provide various safety functions or convenience functions by using the distance, angle and a range rate between the host vehicle and an object around the host vehicle.

For example, by using information input from a radar mounted on the vehicle to determine the distance, angle and a range rate between a host vehicle and an object around the host vehicle, there may be performed a collision avoidance function during parking and stopping, a smart cruise function while driving, or an automatic parking function.

Since the radar mounted on the vehicle plays an important role to perform various functions, the reliability of the information input from the radar is also important.

In particular, accurately determining the movement direction of an object detected in the vicinity of the own vehicle is important to maintain the driving stability of the host vehicle, and the need for research on this is required.

SUMMARY

In this background, embodiments of the present disclosure provide a radar control device and method capable of estimating an orientation angle of an object using one of a plurality of determined predicted object positions.

In an aspect of the present disclosure, there is provided a radar control device including a transceiver configured to transmit a transmission signal for detecting surroundings of a host vehicle through a radar mounted on the host vehicle and receive a reflected reception signal, an object position determiner configured to determine a first measurement reflected from an object in a first period and a second measurement in a second period after the first period based on the reception signal, and determine a first object position in the first period based on the first measurement and determine a second object position in the second period based on the second measurement, and an object direction estimator configured to set a plurality of boundary lines uniformly dividing a predetermined area around the first object position, determine a plurality of predicted objects each having, as an orientation angle, a direction in which the plurality of boundary lines extend from a center of the first object position, respectively, and estimate an orientation angle of a predicted object closest to the second object position as an orientation angle of the object in the second period.

In another aspect of the present disclosure, there is provided a radar control method including transmitting a transmission signal for detecting surroundings of a host vehicle through a radar mounted on the host vehicle and receiving a reflected reception signal, determining a first measurement reflected from an object in a first period and a second measurement in a second period after the first period based on the reception signal, and determining a first object position in the first period based on the first measurement and determining a second object position in the second period based on the second measurement, and setting a plurality of boundary lines uniformly dividing a predetermined area around the first object position, determining a plurality of predicted objects each having, as an orientation angle, a direction in which the plurality of boundary lines extend from a center of the first object position, respectively, and estimating an orientation angle of a predicted object closest to the second object position as an orientation angle of the object in the second period.

According to embodiments of the radar control device and method according to the present disclosure, it is possible to estimate an orientation angle of an object with only a small number of measurements, and accordingly, to estimate an orientation angle for an object detected at a long distance.

DETAILED DESCRIPTION

Figure 1:
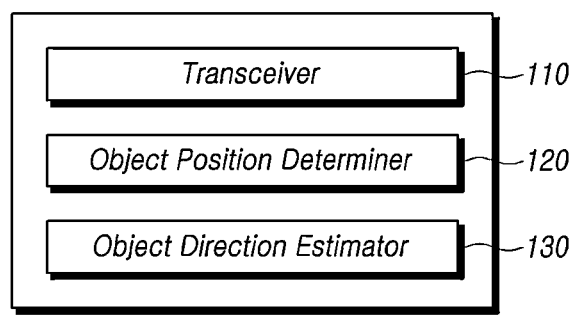
FIG. 1 is a block diagram illustrating a radar control device according to an embodiment of the present disclosure.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless they are used along with additional terms such as "directly" or "immediately".

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

FIG. 1 is a block diagram illustrating a radar control device according to an embodiment of the present disclosure.

Referring to FIG. 1, a radar control device 10 may include a transceiver 110, an object position determiner 120, an object direction estimator 130, and the like.

The radar control device 10 may transmit a transmission signal for detecting surroundings of a host vehicle through a radar mounted on the host vehicle and receive a reflected reception signal, may determine a first measurement reflected from an object in a first period and a second measurement in a second period after the first period based on the reception signal, and determine a first object position in the first period based on the first measurement and determine a second object position in the second period based on the second measurement, and may set a plurality of boundary lines uniformly dividing a predetermined area around the first object position, determine a plurality of predicted objects each having a direction in which the plurality of boundary lines extend from a center of the first object position as an orientation angle, respectively, and estimate an orientation angle of a predicted object closest to the second object position as an orientation angle of the object in the second period. In the present disclosure, an orientation angle may mean a direction to which an object moves with respect to the host vehicle, and may be used in the same meaning as a heading angle, a movement direction, and the like.

The radar control device 10 may transmit/receive data to and from the radar mounted in the host vehicle through a controller area network (CAN) communication, a flexray, or the like.

The radar control device 10 according to an embodiment of the present disclosure may be an advanced driver assistance systems (ADAS) which provides information to assist the driving of the host vehicle or provides assistance to the driver in controlling the host vehicle.

Here, ADAS may refer to various types of advanced driver assistance systems, and examples of the driver assistance systems may include, for example, an autonomous emergency braking (AEB), a smart parking assistance system (SPAS), a blind spot detection (BSD) system, an adaptive cruise control (ACC) system, a lane departure warning system (LDWS), a lane keeping assistance System (LKAS), a lane change assistance system (LCAS), and the like. However, the present disclosure is not limited thereto.

The radar control device may detect objects such as vehicles and traffic lights in the vicinity of the host vehicle based on the measurements calculated by transmitting and receiving a transmission signal and a reception signal through the radar.

Here, the host vehicle may refer to a vehicle capable of moving on the ground without using a railroad or a built-in line by mounting a prime mover and rolling wheels with the power. The host vehicle may be an electric vehicle which is powered by electricity, and obtains driving energy by rotating a motor with electricity accumulated in a battery rather than obtaining driving energy from combustion of fossil fuels.

The radar control device 10 may be applied to a manned vehicle controlled by a driver of the host vehicle or an autonomous vehicle that automatically travels without driver intervention.

The transceiver 110 may transmit a transmission signal to the vicinity of the host vehicle 20 and receive a reception signal in which the transmission signal is reflected by an object.

Here, the radar may include an antenna unit, a transmitter and a receiver.

Specifically, the antenna unit may include one or more transmission antennas and one or more receiving antennas, and each transmission/receiving antenna may be an array antenna in which one or more radiating elements are connected in series by a feed line, but is not limited thereto.

The antenna unit may include a plurality of transmission antennas and a plurality of receiving antennas, and may have various types of antenna array structures according to an arrangement order and an arrangement interval thereof.

The transmitter may provide a function of transmitting a transmission signal through a switched transmission antenna by switching to one of a plurality of transmission antennas included in the antenna unit or transmitting a transmission signal through a multi-transmission channel allocated to the plurality of transmission antennas.

The transmitter may include an oscillator for generating a transmission signal for one transmission channel allocated to the switched transmission antenna or multi-transmission channels allocated to a plurality of transmission antennas. The oscillator may include, for example, a voltage-controlled oscillator (VCO) and an oscillator.

The receiver may receive a reception signal received by being reflected from an object through a receiving antenna.

In addition, the receiver may provide a function of receiving a reception signal, which is a reflection signal of the transmission signal reflected by a target, through the switched receiving antenna by switching to one of a plurality of receiving antennas, or a function of receiving a reception signal through multi-receiving channels allocated to a plurality of receiving antennas.

The receiver may include a low-noise amplifier (LNA) for low-noise amplification of a reception signal received through one receiving channel allocated to the switched receiving antenna or received through a multi-receiving channel allocated to a plurality of receiving antennas, a mixer for mixing the low-noise amplified reception signal, an amplifier for amplifying the mixed reception signal, and a converter (e.g., an analog digital converter) for digitally converting the amplified reception signal to generate reception data.

In addition, the transceiver 110 of the radar control device 10 may receive a reception signal and may receive digitally converted reception data.

The transceiver 110 may transmit a transmission signal at a predetermined period and receive a reception signal. Here, the predetermined period may mean, for example, a time interval until the transceiver transmits a transmission signal again after transmitting/receiving a signal and acquiring the data by determining the measurements for the reception signal. In addition, in order to distinguish between the reception signals according to the time, the expression of the period of the transceiver may be referred to 1st scan, 2nd scan, . . . , nth scan or 1st period, 2nd period, . . . , nth period, etc.

The transceiver 110 may transmit and receive the above-described transmission signal and reception signal at predetermined periods. Accordingly, when the host vehicle is driving, an object detected within the detection range may have a different detected position for each detection period.

The object position determiner 120 may determine a first measurement reflected from an object in a first period and a second measurement in a second period after the first period based on the reception signal, and determine a first object position in the first period based on the first measurement and determine a second object position in the second period based on the second measurement.

The object position determiner 120 may perform Fast Fourier Transform (FFT) on the reception signal to determine a measurement reflected from the object, and determine a range rate for the measurement.

Specifically, the object position determiner 120 may determine a measurement or a measurement value by performing FFT on the reception signal. Specifically, the object position determiner 120 may perform a first-order FFT for the reception signal to convert it into a range-time index with respect to frequency, and perform a second-order FFT on time to obtain range-Doppler index so as to determine the measurement.

The object position determiner 120 may calculate the first object position for the first measurement and the second object position for the second measurement by using Equation 1 below.

$$\begin{bmatrix} x_{n+1} \\ y_{n+1} \end{bmatrix} = \begin{bmatrix} \cos(\Delta\varphi) & \sin(\Delta\varphi) \\ -\sin(\Delta\varphi) & \cos(\Delta\varphi) \end{bmatrix} * \begin{bmatrix} x_n \\ y_n \end{bmatrix} - \begin{bmatrix} v_{x,h,n} \\ v_{y,h,n} \end{bmatrix}$$ [Equation 1]

Here, $x_{n+1}$ may be a longitudinal position of the object in the $n+1_{th}$ scan, $y_{n+1}$ may be a lateral position of the object in the $n+1_{th}$ scan, and $\Delta\phi$ may be a change amount in a heading angle of the host vehicle during the $n+1_{th}$ scan in the nth scan, $v_{x,h,n}$ may mean the longitudinal speed of the host vehicle in the nth scan, and $v_{y,h,n}$ may mean the lateral speed of the host vehicle in the $n_{th}$ scan.

Since the measurements determined through the above-described FFT are the speed and distance based on the host vehicle, the object position determiner 120 may convert the relative position of the object into an absolute position by compensating for the speed of the host vehicle.

In addition, $\Delta\phi$ may be determined as a yaw-rate change amount during a predetermined period. This may be expressed as in Equation 2 below.

$$\Delta\varphi = \text{Yaw rate} * \Delta T$$ [Equation 2]

If a plurality of the first measurements are determined, the object position determiner 120 may determine the first object position based on an average value of the plurality of determined first measurements. Since the measurement may include a position component, if a single measurement is determined, the position of the measurement may be determined as the object position. If a plurality of second measurement are determined, the object position determiner 120 may determine the second object position based on an average value of the second measurements as in the case of the first measurements.

The object position determiner 120 may determine the position of the first object by setting a track for estimating the position of the object based on the reception signal, and calculating an average value from the first measurements included in the track. Accordingly, the radar control device 10 may estimate the orientation angle of the object based on the more accurate position of the object.

Here, the first period may be a period in which the first reception signal reflecting the object is received. That is, the first measurement may be a measurement value determined from the reception signal in the 1st scan or the 1st period. In addition, the second period may be a period in which the fifth reception signal reflecting the object is received. That is, the second measurement may be a measurement value determined from the reception signal in the 5th scan or the 5th period. The second period may mean after the first period, and if the first period corresponds to a 3rd scan, the second period may correspond to a 4th scan.

Figure 2:
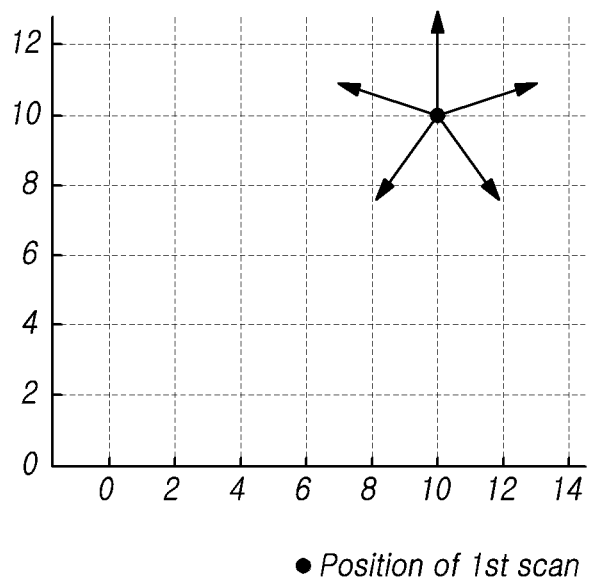
FIG. 2 is a diagram for explaining estimating an orientation angle of an object by setting an predicted object having a plurality of angles based on a first measurement, according to an exemplary embodiment.

FIG. 2 is a diagram for explaining estimating an orientation angle of an object by setting the predicted objects having a plurality of angles based on a first measurement, according to an exemplary embodiment.

Referring to FIG. 2, the object direction estimator 130 may set a plurality of boundary lines uniformly dividing a predetermined area around the first object position, determine a plurality of predicted objects each having a direction in which the plurality of boundary lines extend from a center of the first object position as an orientation angle, respectively, and estimate an orientation angle of a predicted object closest to the second object position as an orientation angle of the object in the second period.

Here, the predetermined area may be, for example, a form of a circle centered on the first measurement. Accordingly, if the area is uniformly divided while passing through the first object position, a plurality of divided angles may be uniformly formed, respectively.

In addition, the plurality of angles is not limited to a specific number, and may be flexibly set according to the driving situation. For example, in the case that a faster operation is required, the area may be divided into five angles as shown in FIG. 2, and if it is required to estimate an orientation angle more accurately, the area may be divided into eleven angles.

Figure 3:
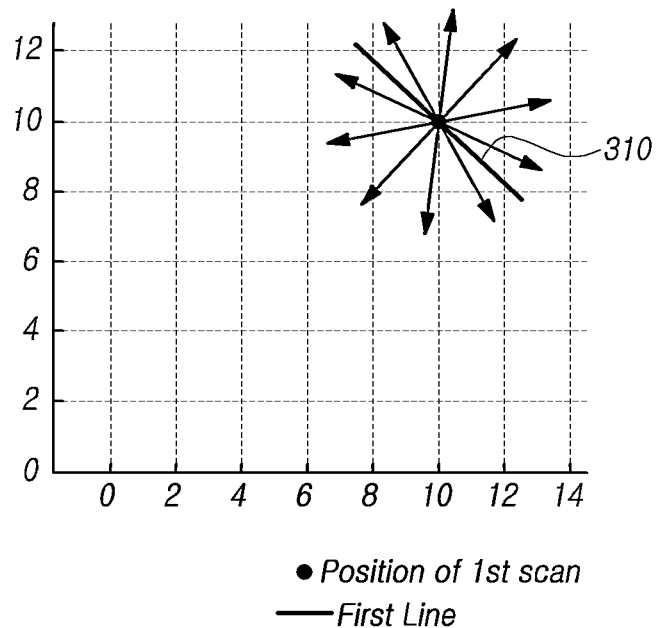
FIG. 3 is a diagram for explaining estimating an orientation angle by dividing an area centered on a first object position by a first line, according to an exemplary embodiment.

FIG. 3 is a diagram for explaining estimating an orientation angle by dividing an area centered on a first object position by a first line 310, according to an exemplary embodiment.

Referring to FIG. 3, the object direction estimator 130 may determine a range rate for the second measurement, divide the area by a first line 310 passing through the first object position, select one of the divided areas based on the range rate, and set a plurality of angles for uniformly dividing the selected area. Here, if there are a plurality of second measurements, the above-described range rate may be determined based on an average value of the second measurements. Here, the range rate may mean a speed of the object along a line extending from the radar to the target (i.e., measurement).

If the range rate is negative, the object direction estimator 130 may select an area close to the radar among the divided areas. That is, the orientation angle of the object may be estimated by selecting area 'a' of FIG. 3.

If the range rate is a positive, the object direction estimator 130 may select an area far from the radar among the divided areas. That is, the orientation angle may be estimated by selecting area 'b' of FIG. 3.

Figure 4:
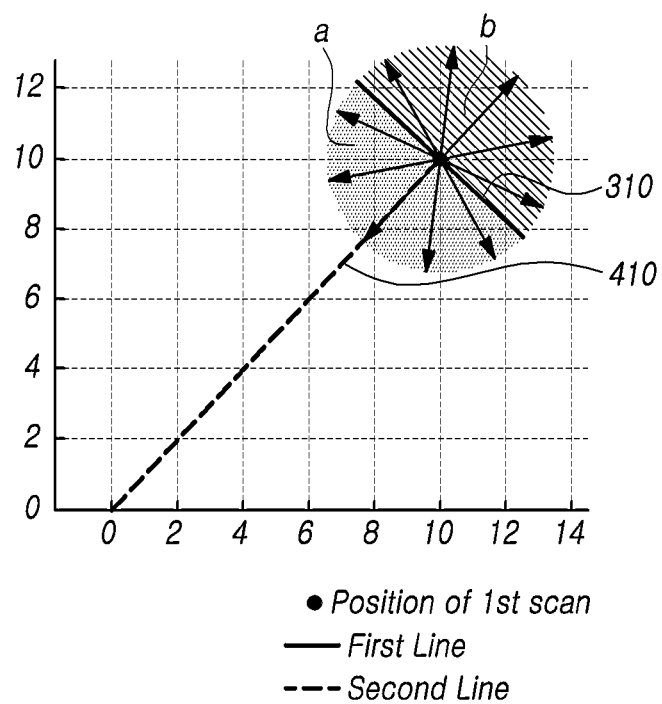
FIG. 4 is a diagram for explaining a direction of a first line according to an embodiment.

FIG. 4 is a diagram for explaining a direction of a first line 310 according to an embodiment.

Referring to FIG. 4, the first line 310 may be perpendicular to a second line 410 passing through an azimuth angle between the radar and the first object position. Specifically, the second line 410 may pass through an azimuth angle formed by the first object position with respect to the front of the sensor, and accordingly, the second line 410 may pass through the first object position. In addition, the first line 310 may be set to be perpendicular to the above-described second line 410.

Accordingly, the radar control device 10 according to the present disclosure may calculate a range rate of an object to more accurately estimate an orientation angle or an object direction.

Figure 5:
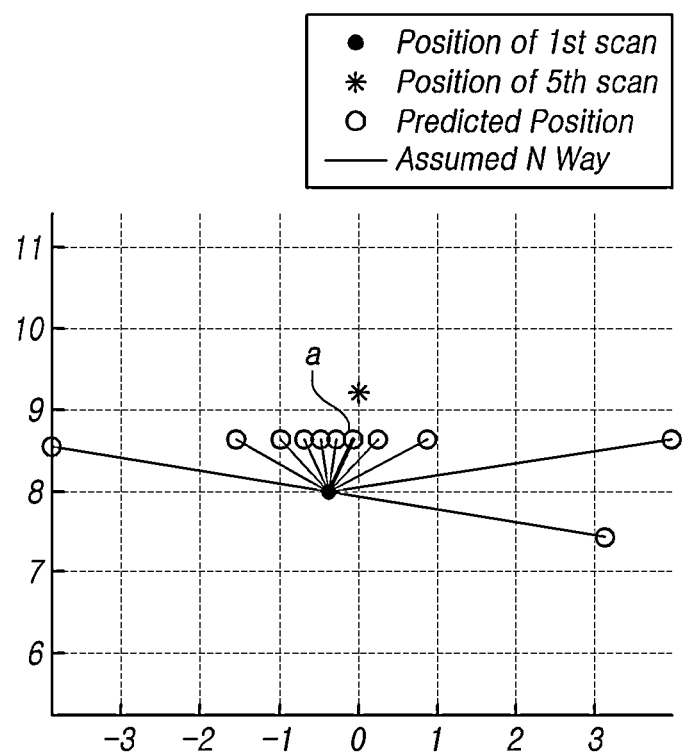
FIG. 5 is a diagram for describing setting an orientation angle of a predicted object closest to a second object position as an orientation angle of the object, according to an embodiment.

FIG. 5 is a diagram for describing setting an orientation angle of a predicted object closest to a second object position as an orientation angle of the object, according to an embodiment.

Referring to FIG. 5, the object direction estimator 130 may determine the positions of the predicted objects, and determine an orientation angle of the predicted object closest to the second object position among the plurality of predicted objects as an orientation angle of the object in the second period.

Specifically, the object direction estimator 130 may determine a velocity or a speed of the predicted object by using Equation 3 below, and may determine the position of the predicted object in the second period by using the first object position.

$$|v_i| = \frac{|\dot{r}_c|}{\cos(\phi_i - \theta)}$$ [Equation 3]

$$v_{x,i} = |v_i| * \cos(\phi_i)$$

$$v_{y,i} = |v_i| * \sin(\phi_i)$$

$$x_{(k+1),i} = k * v_{x,i} + x_1$$

$$y_{(k+1),i} = k * v_{y,i} + y_1$$

$$(i = 1, 2, \ldots, 11)$$

Here, $|v_i|$ may be the estimated absolute velocity, may be the compensated range rate, $\phi i$ may be the estimated orientation angle, $\theta$ may be the azimuth, $v_x$, i may be the estimated longitudinal velocity, and $v_y$, i may be the estimated lateral velocity, (x1, y1) may be the object position of the 1st scan, that is, the first object position, $x_{(k+1), i}$ may be the estimated longitudinal position after the kth scan, $y_{(k+1)}$, i may be a lateral position estimated after kth scan.

The compensated range rate may be calculated through Equation 4 below.

$$\dot{r}_c = \dot{r} + v_{x,h,n} * \cos(\theta)$$ [Equation 4]

If the first period is the 1st scan, the object direction estimator 130 may determine the position of the predicted object by setting ΔT in Equation 2 above to the time interval of the 1st scan and the 5th scan instead of a predetermined period.

In addition, if the first period is the 1st scan, the object direction estimator 130 may determine the position of the predicted object by applying the object positions in the 2nd, 3rd, and 4th scans calculated through Equation 1 above.

In addition, the object position determiner 120 may set the first period to the 4th scan to determine the first object position for the 4th scan, and the object direction estimator 130 may determine the position of the predicted object based on the first object position for the 4th scan.

As described above, the radar control device 10 of the present disclosure may estimate one of the predicted objects calculated by compensating for the range rate with the object as the orientation angle of the object, so that it is possible to estimate the orientation angle of an object more accurately, and it is possible to estimate the orientation angle even for an object located at a long distance.

The radar control device 10 may be implemented as an electronic control unit (ECU), a microcomputer, or the like.

For example, an electronic control unit (not shown) of the radar control device 10 may include at least one or more elements of one or more processors, memories, storage unit, user interface input unit and user interface output unit, which may communicate with each other via a bus. Furthermore, the electronic control unit may also comprise a network interface for connecting to the network. The processor may be a CPU or a semiconductor device that executes processing instructions stored in memory and/or storage unit. Memory and storage unit may include various types of volatile/non-volatile storage media. For example, memory may include ROM and RAM.

More specifically, the radar control device 10 according to the present embodiment, and the transceiver 110, the object position determiner 120 and the object direction estimator 130 included therein may be implemented as a control device of a sensor system of a vehicle or as a module of an ECU.

The control device or ECU of such a sensor system may include a processor, a storage device such as a memory, and a computer program capable of performing a specific function. In addition, the transceiver 110, the object position determiner 120 and the object direction estimator 130 may be implemented as software modules capable of performing respective corresponding functions.

That is, the transceiver 110, the object position determiner 120 and the object direction estimator 130 according to the present embodiment may be implemented as respective software modules and stored in a memory, and each software module may be executed at a specific time point in an arithmetic processing unit such as an ECU included in the radar system.

Hereinafter, it will be described a radar control method using the radar control device 10 capable of performing all of the above-described present disclosure.

Figure 6:
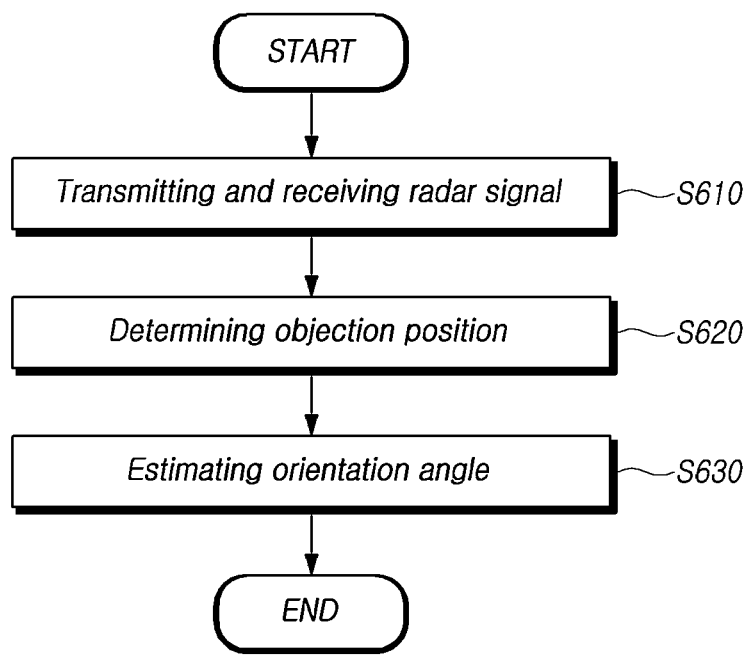
FIG. 6 is a flowchart illustrating a radar control method according to an embodiment of the present disclosure.

FIG. 6 is a flowchart illustrating a radar control method according to an embodiment of the present disclosure.

Referring to FIG. 6, a radar control method according to an embodiment of the present disclosure may include a transmitting/receiving step S610 of transmitting a transmission signal for detecting surroundings of a host vehicle through a radar mounted on the host vehicle and receiving a reflected reception signal; an object position determination step S620 of determining a first measurement reflected from an object in a first period and a second measurement in a second period after the first period based on the reception signal, and determining a first object position in the first period based on the first measurement and determining a second object position in the second period based on the second measurement; and an object direction estimation step S630 of setting a plurality of angles around the first object position that uniformly divide the area around the first measurement, determining a plurality of predicted objects each having, as an orientation angle, a plurality of set angles, respectively, and estimating the orientation angle of the predicted object closest to the second object position as the orientation angle of the object of the second period.

Here, in the object position determination step S620, if a plurality of the first measurements are determined, the first object position may be determined based on an average value of the plurality of first measurements. This may be equally applied when a plurality of second measurements are determined. That is, in the object position determination step S620, if a plurality of the second measurements are determined, the second object position may be determined based on an average value of the plurality of second measurements.

In the object position determination step S620, a track for estimating a position of the object may be set based on the reception signal, an average value may be determined from the first measurements included in the track, and the first object position may be determined therefrom.

The object position determination step S620 may include determining the first object position and the second object position based on a yaw-rate change amount according to a preset period. The radar control device 10 may calculate the first object position and the second object position using Equations 1 and 2 described above. In addition, AT in Equation 2 may be used to determine a predicted object by changing a value according to the first period and the second period.

Figure 7:
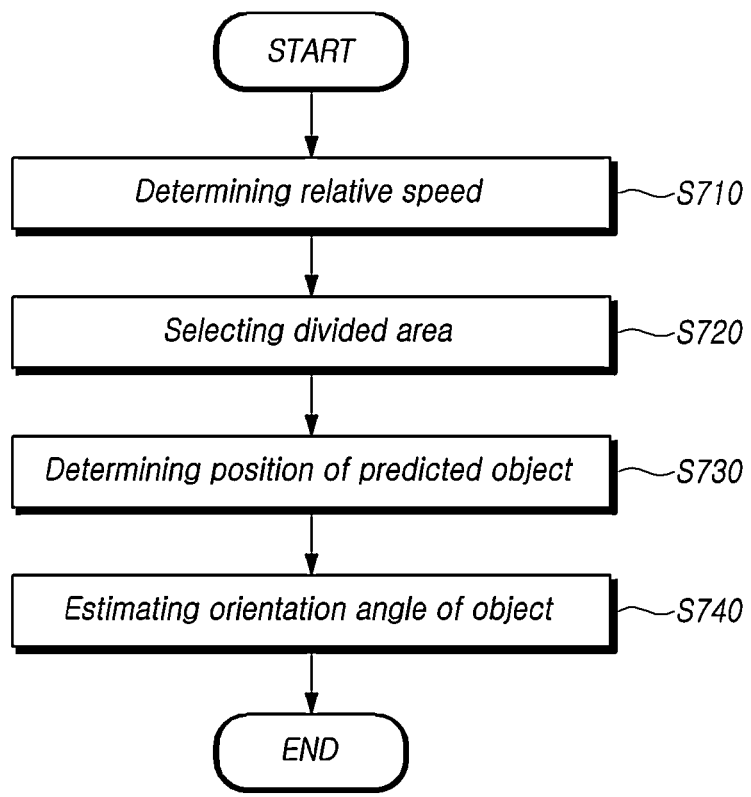
FIG. 7 is a flowchart for describing step S630 in more detail according to an embodiment.

FIG. 7 is a flowchart for describing step S630 in more detail according to an embodiment.

Referring to FIG. 7, the radar control device 10 may calculate a range rate for the second measurement (S710). The radar control device 10 may calculate a range rate for the second measurement by performing FFT on the reception signal. In addition, the radar control device 10 may calculate the corrected range rate or the compensated range rate for the second measurement by using Equations 3 and 4 described above.

The radar control device 10 may divide an area centered on the first object position by a first line 310 passing through the first object position, select one area from among the divided areas based on the range rate, and set a plurality of angles for uniformly dividing the selected area (S720).

For example, if the range rate is a negative value, the radar control device 10 may select an area close to the radar among the divided areas. As another example, if the range rate is a positive value, the radar control device 10 may select an area far from the radar among the divided areas.

Here, the first line 310 may be perpendicular to a second line 410 passing through an azimuth angle between the radar and the first object position.

The radar control device 10 may determine a speed or a velocity of the object in each direction divided into a plurality of angles by using Equations 3 and 4 described above, and determine the position of the predicted object (S730). As shown in FIG. 5, the position of the predicted object may be located on a line in each direction divided into a plurality of angles. The position of the predicted object may refer to a position determined in the second period by applying the speed in each direction with the first object position as a starting point.

The radar control device 10 may estimate an orientation angle or a moving direction of the predicted object closest to the second object position among the positions of the predicted objects positioned on each divided direction line as the orientation angle of the object in the second period (S740).

As described above, according to embodiments of the radar control device and method according to the present disclosure, it is possible to estimate an orientation angle of an object with only a small number of measurements, and accordingly, to estimate an orientation angle for an object detected at a long distance.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:

1. A radar control device comprising:
a transceiver configured to transmit a transmission signal for detecting surroundings of a host vehicle through a radar mounted on the host vehicle and receive a reflected reception signal;
an object position determiner configured to determine a first measurement reflected from an object in a first period and a second measurement in a second period after the first period based on the reception signal, and determine a first object position of an object in the first period based on the first measurement and determine a second object position of an object in the second period based on the second measurement; and
an object direction estimator configured to set a plurality of boundary lines uniformly dividing a predetermined area around the first object position, each of the plurality of boundary lines extending in a respective direction from a center of the first object position, determine a plurality of objects, each of the plurality of objects having a movement direction corresponding to the respective direction in which the each of the plurality of boundary lines extends from the center of the first object position, and estimate a movement direction of an object closest to the second object position among the plurality of objects as a movement direction of the object in the second period.

2. The radar control device of claim 1, wherein the object direction estimator determines a range rate for the second measurement, divides the area by a first line passing through the first object position, selects one of the divided areas based on the range rate, and sets a plurality of angles for uniformly dividing the selected area.

3. The radar control device of claim 2, wherein the first line is perpendicular to a second line passing through an azimuth angle between the radar and the first object position.

4. The radar control device of claim 2, wherein, if the range rate is negative, the object direction estimator selects an area close to the radar among the divided areas.

5. The radar control device of claim 2, wherein if the range rate is positive, the object direction estimator selects an area far from the radar among the divided areas.

6. The radar control device of claim 1, wherein, if a plurality of the first measurements are determined, the object position determiner determines the first object position based on an average value of the plurality of determined first measurements.

7. The radar control device of claim 6, wherein the object position determiner sets a track for estimating a position of the object based on the reception signal, calculates an average value from the first measurements included in the track, and determines the first object position.

8. The radar control device of claim 1, wherein the object position determiner determines the first object position and the second object position based on a yaw-rate change amount according to a preset period.

9. The radar control method comprising:
transmitting a transmission signal for detecting surroundings of a host vehicle through a radar mounted on the host vehicle and receiving a reflected reception signal;
determining a first measurement reflected from an object in a first period and a second measurement in a second period after the first period based on the reception signal, and determining a first object position of an object in the first period based on the first measurement and determining a second object position of an object in the second period based on the second measurement; and
setting a plurality of boundary lines uniformly dividing a predetermined area around the first object position, each of the plurality of boundary lines extending in a respective direction from a center of the first object position, determining a plurality of objects, each the plurality of objects having a movement direction corresponding to the respective direction in which the each of the plurality of boundary lines extends from the center of the first object position, and estimating a movement direction of an object closest to the second object position among the plurality of object as a movement direction of the object in the second period.

10. The radar control method of claim 9, wherein the estimating a movement direction comprises determining a range rate for the second measurement, dividing the area by a first line passing through the first object position, selecting one of the divided areas based on the range rate, and setting a plurality of angles for uniformly dividing the selected area.

11. The radar control method of claim 10, wherein the first line is perpendicular to a second line passing through an azimuth angle between the radar and the first object position.

12. The radar control method of claim 10, wherein the estimating an orientation angle comprises, if the range rate is negative, selecting an area close to the radar among the divided areas.

13. The radar control method of claim 10, wherein the estimating an orientation angle comprises, if the range rate is positive, selecting an area far from the radar among the divided areas.

14. The radar control method of claim 10, wherein the determining a first object position comprises, if a plurality of the first measurements are determined, determining the first object position based on an average value of the plurality of determined first measurements.

15. The radar control method of claim 14, wherein the determining a first object position comprises setting a track for estimating a position of the object based on the reception signal, calculating an average value from the first measurements included in the track, and determining the first object position.

16. The radar control method of claim 9, wherein the determining a first object position comprises determining the first object position and the second object position based on a yaw-rate change amount according to a preset period.

* * * * *